US008081665B2

(12) United States Patent
Gorshe et al.

(10) Patent No.: US 8,081,665 B2
(45) Date of Patent: Dec. 20, 2011

(54) VIRTUAL CONCATENATION OF PDH SIGNALS

(75) Inventors: Steven Scott Gorshe, Beaverton, OR (US); Nevin R. Jones, Middlesex, NJ (US)

(73) Assignees: PMC—Sierra, Inc., Santa Clara, CA (US); Agere Systems, Inc., Allentown, PA (US)

( * ) Notice: Subject to any disclaimer, the term of this patent is extended or adjusted under 35 U.S.C. 154(b) by 769 days.

(21) Appl. No.: 11/367,747

(22) Filed: Mar. 3, 2006

(65) Prior Publication Data

US 2006/0222005 A1 Oct. 5, 2006

Related U.S. Application Data

(60) Provisional application No. 60/658,945, filed on Mar. 4, 2005.

(51) Int. Cl.
*H04J 3/04* (2006.01)
(52) U.S. Cl. ...................................................... 370/535
(58) Field of Classification Search .......... 370/535–543, 370/466
See application file for complete search history.

(56) References Cited

U.S. PATENT DOCUMENTS

| 2003/0035445 A1* | 2/2003 | Choi ............................ 370/535 |
| 2005/0068993 A1* | 3/2005 | Russell et al. ................ 370/537 |
| 2006/0187715 A1* | 8/2006 | Narvaez et al. .......... 365/185.24 |
| 2007/0019653 A1* | 1/2007 | Bolle et al. ............... 370/395.51 |

OTHER PUBLICATIONS

ITU-T, G.7043/Y.1343, Virtual Concatenation of plesiochronous digital (PDH) signals.*
"Interoperability Requirements for Nx56/64 kbit/s Calls," Version 1.0, from the Bandwidth ON Demand INteroperability Group (BONDING) Consortium, 1992.
Sklower et al., "The PPP Multilink Protocol (MP)", RFC 1990, Aug. 1996, 20 pages.
The ATM Forum Technical Committee, "Inverse Multiplexing for ATM (IMA) Specification," AF-PHY-0086.001, Mar. 1999. 185 pages.
Ellanti, "Next Generation Transport Networks: data, management, and control planes," Chapters 1 through 4, 276 pages, Copyright 2005, Springer Science & Business Media, Inc.
Gorshe, "LCAS: Ins and Outs of Making Dynamic Bandwidth Adjustment in the Metro," Proceeding of Communications Design Conference (invited paper), Mar. 2004, 15 pages.

(Continued)

*Primary Examiner* — Chirag G Shah
*Assistant Examiner* — Amarnauth Persaud
(74) *Attorney, Agent, or Firm* — Kilpatrick Townsend & Stockton LLP; Ardeshir Tabibi (57) ABSTRACT

Asynchronous/plesiochronous digital hierarchy (PDH) signals, such as DS1 and E1, are transported using virtual concatenation. The packetized data signals are frame encapsulated and subsequently inverse multiplexed into a plurality of PDH frames. An overhead packet is inserted in the transmitted frames to enable the receiver to determine the status of the frames and extract the differential delay experienced by various frames as they are routed through virtually concatenated channels. The extracted delays enables the receiver to realign the various frames of the PDH signal to reconstitute the originally transmitted signals that travel through different paths of the transport network linking the source and sink of the virtually concatenated channel.

26 Claims, 5 Drawing Sheets

OTHER PUBLICATIONS

Shi et al., article titled "SDH Virtual Concatenation Technique Used in Ethernet Data Transport" in Communications, Circuits and Systems and West Sino Expositions IEEE 202 International Conference.*

Jones, et al., "A Justification for a Variable Bandwidth Allocation Methodology for SONET Virtually Concatenated SPEs," Contribution to T1 Standards Project—T1X1.5, Jul. 10-14, 2000, 4 pages.

Jones, et al., A Proposed Variable Bandwidth Allocation (VBA) Methodology for Sonet Virtually Concatenated SPEs, Contribution to T1 Standards Project—T1X1.5, Jul. 10-14, 2000, 22 pages.

Jones, et al., "Higher Order SONET Virtual Concatenation," Digital Optical Hierarchy, Contribution to T1 Standards Project-T1X1.5, Apr. 9, 1999, 3 pages.

Jones, et al., "A Proposed Link Capacity Adjustment Scheme (LCAS) for Sonet Virtually Concatenated SPEs," Contribution to T1 Standards Project—T1X1.5, Oct. 9-13, 2000, 30 pages.

Weissberger, et al., "N X VT1.5 Channel Overhead and Provisioning," Contribution to T1 Standards Project, Apr. 13-15, 1999, 3 pages.

Weissberger, "Suggestions for Standardization of n x vt1.5 concatenated payload with mapping for IEEE 802.3 MAC frames, MPEG2 Ts, and Fiber Channel," Contribution to T1 Standards Project, Apr. 13-15, 1999, 8 pages.

"Synchronous Optical Network (SONET)—Payload mappings (inclusion of Virtual Concatenation)," American National Standard for Telecommunications, T1X1.5/2000-126R2, Jul. 2000, 9 pages.

* cited by examiner

| Concatenation overhead octet definition ||||||||
| Bit 1 | Bit 2 | Bit 3 | Bit 4 | Bit 5 | Bit 6 | Bit 7 | Bit 8 |
|---|---|---|---|---|---|---|---|
| Control Packet |||| MFI1 ||||
| MST (bits 1–4) |||| 1 | 0 | 0 | 0 |
| MST (bits 5–8) |||| 1 | 0 | 0 | 1 |
| 0 | 0 | 0 | RS-ACK | 1 | 0 | 1 | 0 |
| Reserved (0000) |||| 1 | 0 | 1 | 1 |
| Reserved (0000) |||| 1 | 1 | 0 | 0 |
| Reserved (0000) |||| 1 | 1 | 0 | 1 |
| Reserved (0000) |||| 1 | 1 | 1 | 0 |
| SQ bits 1–4 |||| 1 | 1 | 1 | 1 |
| MFI2 MSBs (bits 1–4) |||| 0 | 0 | 0 | 0 |
| MFI2 LSBs (bits 5–8) |||| 0 | 0 | 0 | 1 |
| CTRL |||| 0 | 0 | 1 | 0 |
| 0 | 0 | 0 | GID | 0 | 0 | 1 | 1 |
| Reserved (0000) |||| 0 | 1 | 0 | 0 |
| Reserved (0000) |||| 0 | 1 | 0 | 1 |
| $C_1$ | $C_2$ | $C_3$ | $C_4$ | 0 | 1 | 1 | 0 |
| $C_5$ | $C_6$ | $C_7$ | $C_8$ | 0 | 1 | 1 | 1 |

*FIG. 5*

| Concatenation overhead byte definition ||||||||
| Bit 1 | Bit 2 | Bit 3 | Bit 4 | Bit 5 | Bit 6 | Bit 7 | Bit 8 |
|---|---|---|---|---|---|---|---|
| Member Status information (MST) ||||||||
| 0 | 0 | 0 | RS-ACK | Reserved ("0000") ||||
| Reserved ("0000 0000") ||||||||
| 0 | 0 | Sequence Indicator (SQ) ||||||
| Multiframe Indicator 2 (MFI2) ||||||||
| CTRL |||| 0 | 0 | 0 | GID |
| Reserved ("0000 0000") ||||||||
| $C_1$ | $C_2$ | $C_3$ | $C_4$ | $C_5$ | $C_6$ | $C_7$ | $C_8$ |

VIRTUAL CONCATENATION OF PDH SIGNALS

CROSS-REFERENCE TO RELATED APPLICATIONS

The present application claims benefit under 35 USC 119 (e) of U.S. provisional application No. 60/658,945, filed Mar. 4, 2005, entitled "Virtual Concatenation Of PDH Signals", the content of which is incorporated herein by reference in its entirety.

BACKGROUND OF THE INVENTION

The global transport network has evolved to use SONET/SDH technology. However, benefits are gained by adding new capabilities to the previous generation asynchronous/plesiochronous digital hierarchy signal (e.g., DS1 and E1) technologies. Both the North American asynchronous hierarchy and the plesiochronous digital hierarchy (PDH) are referred to herein as PDH. These networks, however, are ubiquitously deployed and are more common than SONET/SDH signals for enterprise access applications. Among the reasons for their ongoing prevalence in the enterprise access networks is that many of the access interfaces are still delivered over copper wires.

Figure 1:
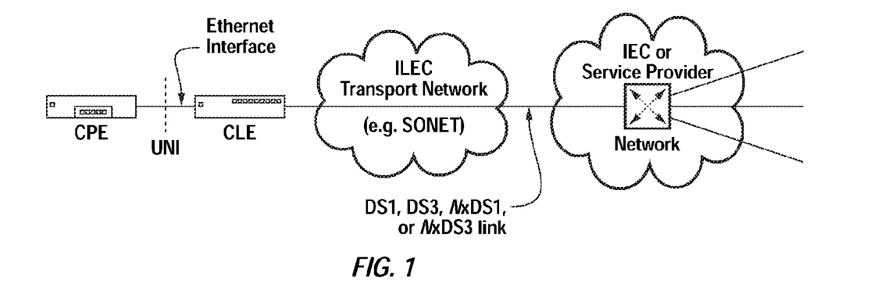
FIG. 1 is a high-level block diagram of a transport network, as known in the prior art.

At least as important as their availability is the advantage they provide due to the regulatory unbundling of services. U.S. incumbent local exchange carriers (ILECs) are required as part of unbundling to offer DS1 and DS3 access links to other carriers, such as competitive local exchange carriers (CLECs) or interexchange carriers (IECs), for lower tariff rates than equivalent SONET interfaces. The result of the tariff advantage and the effectively ubiquitous availability of DS1 and DS3 connectivity is that when IECs or service providers lack their own facilities to connect to their enterprise subscribers, they typically lease DS1 or DS3 connections through the ILECs. An example of such a network configuration is shown in FIG. 1.

The availability of PDH based networks combined with the growing interest in providing native Ethernet connectivity leads inevitably to a desire for mapping of Ethernet into PDH signals. Although a number of proprietary implementations exist, there are no standards for mapping native Ethernet into DS1 and DS3, or NxDS1 and NxDS3 signals. In order to provide Ethernet connectivity to their enterprise customers over DS1/DS3 connections, the major U.S. IECs have asked for GFP mappings into DSn and En signals.

GFP provides an encapsulation of native Ethernet frames in order to carry them through a transport network; see PMC white paper entitled "A tutorial on SONET/SDH", PMC-2030895, the content of which is incorporated herein by reference in its entirety, and attached as Exhibit A. The resulting mappings are specified in the new ITU-T G.8040. Mapping data into multiple DSn or En signals is described in the following publicly available publications, the content of each of which is incorporated herein by reference in its entirety:

> IETF RFC 1990, The PPP Multilink Protocol (MP). K. Sklower, B. Lloyd, G. McGregor, D. Carr, T. Coradetti. August 1996
>
> Interoperability Requirements for Nx56/64 kbit/s Calls, version 1.0, from the Bandwidth ON Demand INteroperability Group (BONDING) Consortium, 1992
>
> ATM Forum AF-PHY-0086.001 (1999)—Inverse Multiplexing for ATM (IMA) Specification The GFP mapping into a single DS3 signal was defined first while mappings into DS1, E1, NxDS1, and NxE1 were studied. Carriers wanted to have the NxDS1 and NxE1 connections and use N=1 for mapping into single signals. Subsequently, interest developed for similar NxDS3 and NxE3 signals (e.g., for carrying data from 100Base Ethernet interfaces). Ideally, the NxDS1/E1/DS3/E3 should operate at Layer 1, providing transparent transport of Layer 2 protocol frames, independent of which Layer 2 protocol is being carried. The only existing non-proprietary solution is the Multilink Point-to-Point Protocol (ML-PPP defined in IETF RFC 1990), which performs inverse multiplexing at the packet level. Inverse multiplexing refers to taking the payload from a higher rate channel and transporting it by distributing it over multiple lower rate channels. The granularity used for assigning the payload data among the lower rate channels can be at the bit, byte, or packet/cell level.

Since ML-PPP is a Layer 2 protocol, it requires terminating the Ethernet signal in order to remap the packets into ML-PPP (i.e., change between the two different Layer 2 protocols). ATM solutions existed, including Inverse Multiplexing over ATM (IMA). The carriers requesting the new mapping did not favor an ATM solution for this application due to its overhead inefficiency and it being another layer to provision. No byte level inverse multiplexing schemes such as VCAT existed since DS1 and DS3 signals lacked sufficient overhead to support VCAT, and reserving an entire payload channel for the overhead was too much capacity to lose.

Another potential solution exist from the Bandwidth ON Demand Interoperability Group (BONDING) consortium. Inverse multiplexing here is performed at the byte level rather than the packet level. An initialization sequence is sent on all the constituent lower-rate channels in order to synchronize the source and sink. While this technique requires no per-packet or per-link overhead, the channel must be disrupted for a long period of re-initialization when the channel size is changed. Table 1 below shows a comparison of the different candidate technologies that were considered.

TABLE 1

Comparison of technologies for inverse multiplexing into NxPDH signals

| OPTION | ADVANTAGE | DISADVANTAGE |
|---|---|---|
| Layer 2 frame inverse multiplexing | Proven technology exists for ML-PPP and Ethernet Link Aggregation<br>No overhead required for each individual E1/DS1/DS3/E3 link<br>Easy to add or remove links (trivial control protocol)<br>NOTE - Layer 1 (i.e., GFP) packet interleaving was also considered, with at least one proprietary solution | Layer 2 technology specific - It either enforces a Layer 2 approach or requires re-mapping client data packets.<br>Requires additional per-packet overhead (e.g., for packet sequence numbering)<br>Egress queue management more complex due to the need to re-align the packets from the different links |

TABLE 1-continued

Comparison of technologies for inverse multiplexing into NxPDH signals

| OPTION | ADVANTAGE | DISADVANTAGE |
|---|---|---|
| | existing. Although it provides the Layer 2 transparency, it otherwise has the same advantages and disadvantages as Layer 2 packet interleaving. | in the correct sequence. When there is a light load, a single link (or subset of links) is used for each packet rather than the entire set. This results in increased latency for lightly loaded cases. Under any load condition, the egress queue management will tend to introduce additional latency. |
| Byte inverse multiplexing with overhead borrowing | Relatively simple. Uses no additional per-link or per-packet overhead. | Changing the number of links (members) requires taking the connection down for a link re-synchronization. |
| Byte inverse multiplexing with permanent overhead channel | Simple (trivial) egress buffer since out-of-order packet arrival is not possible. Can directly re-use SDH virtual concatenation technology. No additional per-packet overhead. Consistency with VCAT and LCAS provides operational consistency and network predictability for the carrier. | Requires per-link overhead. Control protocol for adding and removing links is more complex (same complexity as LCAS). |

SUMMARY OF THE INVENTION

In accordance with the present invention, asynchronous/plesiochronous digital hierarchy (PDH) signals, such as DS1 and E1, are virtually concatenated in order to transport data packets. To achieve this, the data packets are first encapsulated and are subsequently inverse multiplexed into a plurality of PDH signal frames. An overhead packet is inserted in the transmitted frames to enable the receiver determine the status of the frames and extract the differential delay experienced by various PDH signals as they are routed through virtually concatenated channels. The extracted delays enables the receiver to realign the various frames of the PDH signal to reconstitute the originally transmitted signal. The virtual concatenation of signals of the same type (e.g., DS1) allows the creation of a larger transport channel with a granularity equal to size of the signal type being concatenated. Virtual concatenation allows the constituent signals to take different paths through the transport network between the source and sink of the virtually concatenated channel with the sink performing the re-alignment of the signals to compensate for the differential delay in routes through the network.

In some embodiments, the encapsulation of packets into the PDH signals may be performed in accordance with the well know Generic Framing Procedure (GFP). Other encapsulation techniques may be used. In some embodiments, the PDH signal may be any one of DS1, E1, DS3, and E3 signals. The DS1, E1, DS3, and E3 signals as currently defined lack sufficient overhead bandwidth to carry the information required for the virtual concatenation differential delay compensation. In accordance with the present invention, the overhead bandwidth is derived in a manner that has minimum impact on the channel payload capacity while still providing sufficient refresh time for the overhead.

In some embodiments, the inserted overhead packet includes 16 bytes with each byte disposed in one of the frames of a multi-frame. In such embodiments, the 16-byte overhead includes both LCAS and VCAT overhead bits. In other embodiments, the inserted overhead packet includes 8 bytes with each byte disposed in one of the frames of a multi-frame.

DETAILED DESCRIPTION OF THE INVENTION

Figure 2:
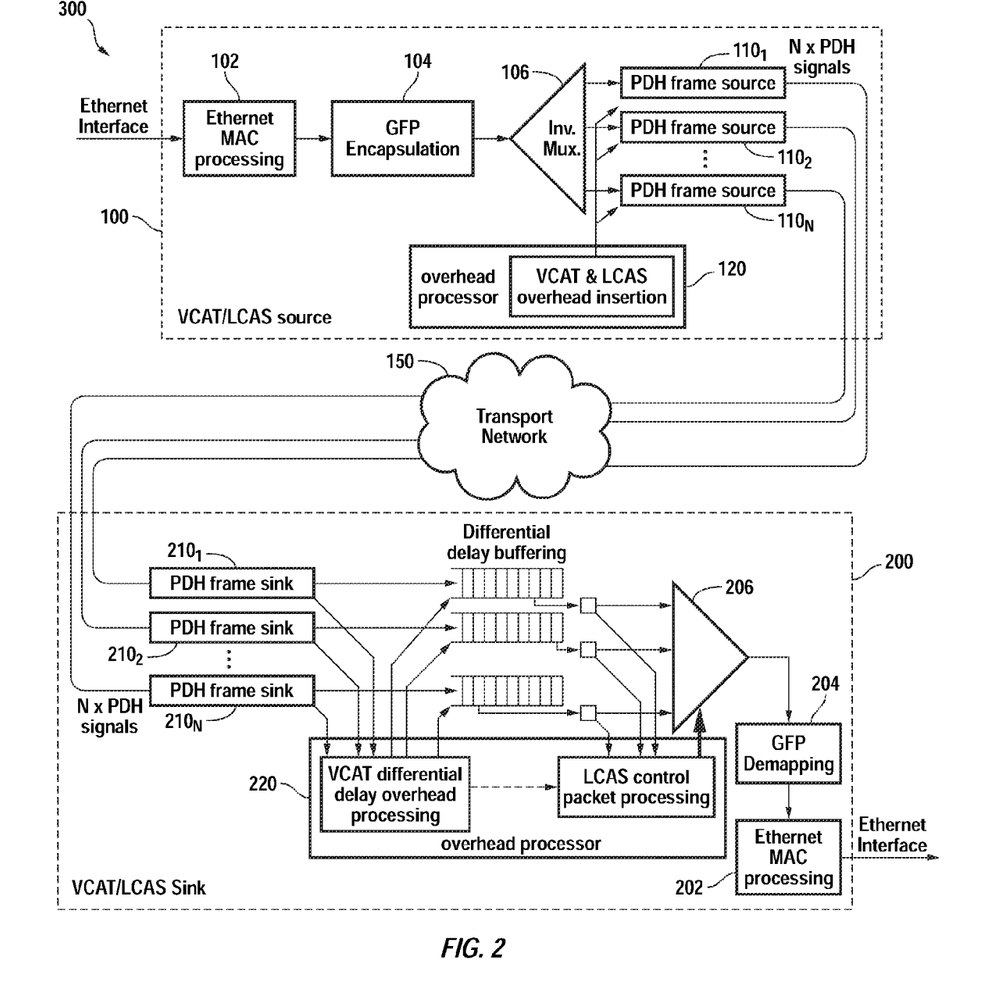
FIG. 2 is a high-level block diagram of a network system, in accordance with one embodiment of the present invention.

FIG. 2 is a high-level block diagram of a network system 300, in accordance with one embodiment of the present invention. An incoming data signal, such as a native Ethernet signal, is received via an interface at the source 100 and is first processed at Ethernet MAC processing block 102 to ensure that it is a valid Ethernet frame. Thereafter the data is encapsulated in a frame for transmission using, for example, a Generic Framing Procedure (GFP) frame). The GFP standard is defined, in ITU-T Recommendation G.7041. Other encapsulation protocols, e.g., byte-oriented HDLC, may also be used. The encapsulated data is then inverse-multiplexed using inverse multiplexer 106 at the byte level into N PDH frames 110 (signals), namely PDH frames $110_1, 110_2 \ldots 110_N$. As shown, the associated virtual concatenation (VCAT) and Link Capacity Adjustment Scheme (LCAS) overheads are added to these signals by overhead processor 120, subsequent to which the signals are transmitted over transport network 150. The LCAS for virtually concatenated channels is defined in the ITU-T Rec. G.7042 standard. An overhead processor is used to insert the overheads Virtual concatenation is a technique for combining multiple smaller channels or signals to form a larger channel. The constituent channels/signals are time-aligned at the source, and the payload data is inverse multiplexed into the constituent channels/signals (members) in a round-robin manner. Unlike explicit concatenation, VCAT allows the constituent smaller channels/signals to take diverse paths/routes through the network. The result of the diverse routes is that constituent members are no longer time-aligned when they arrive at the receiver due to the difference in the route lengths. VCAT overhead is required in order to re-align the members so that the original data can be extracted. All of the constituent members are transmitted with an identical phase indication overhead (e.g., a multiframe number). The receiver uses this phase (multiframe) overhead information to compensate for the difference in route delays and re-align the members. The other required overhead is the original sequence number of the member within the round-robin rotation.

LCAS is a standard method for controlling VCAT channels. LCAS is specified in ITU-T Recommendation G.7042. The LCAS overhead includes the VCAT phase (multiframe) and sequence number indications. LCAS provides additional overhead associated with the status of each constituent member of the virtually concatenated group. This additional information is used to increase or decrease the size of a VCAT channel, signaling the member failure status for the opposite transmission direction, and a group identifier that allows the receiver to confirm that each member is truly part of that VCAT channel.

At the sink end 200, as shown in FIG. 2, framing recovery is performed first on each PDH signal $210_1, 210_2 \ldots 210_N$ in order to extract the differential delay information from the VCAT overhead. This information is then used to control the amount of buffer delay that is applied to each signal in order to re-align them to the phase in which they were launched at the source. The LCAS overhead information for the aligned signals is then processed to determine the status of the signals. The status defines whether the frame is properly received. Overhead processor 220 performs the tasks associated with extracting the VCAT and LCAS overhead information from the received frames. The data from the active signals is then merged together through byte interleaving at multiplexer 206 to reconstruct the original GFP encapsulated signal. The GFP frames are then terminated at GFP demapping block 204 and the Ethernet signal is extracted at Ethernet MAC processing block 202. The extracted signals are subsequently supplied from sink node 200 via an interface.

In accordance with one embodiment of the present invention, byte-level inverse multiplexing is used, as shown in FIG. 2. One octet from the signal's payload area, once per multiframe, is borrowed to carry the per-link overhead information rather than permanently reserving the entire time slot. This proposal has been adopted for the new ITU-T Recommendation G.7043. The content of this overhead octet is then defined in a manner consistent with the SONET/SDH H4 byte that is used for the virtual concatenation of SONET STS-1/Nc (SDH VC-4/4-Nc) links.

Figure 3A:
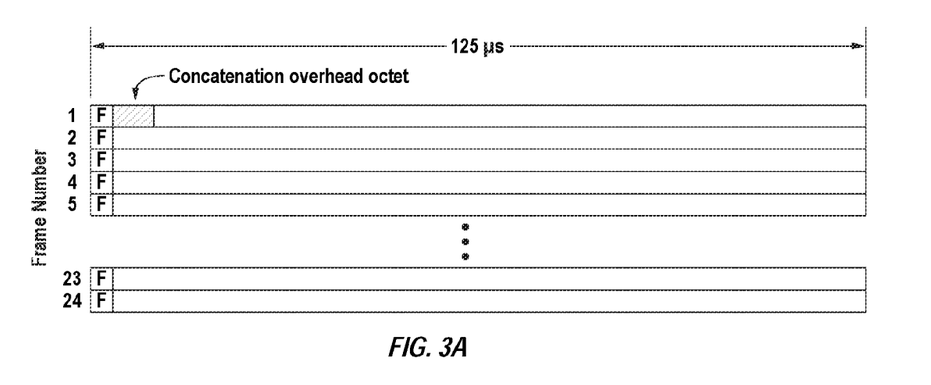
FIG. 3A shows a DS1 frame adapted to carry an overhead byte, in accordance with one embodiment of the present invention.

FIGS. 3A, 3B, 3C, and 3D respectively show the resulting multiframe formats for the DS1, E1, DS3, and E3 signals, in accordance with one embodiment of the present invention. Referring to FIG. 3A, the VCAT and LCAS overhead, which together form an octet (i.e., 8 bits) are disposed after the F (framing bit) bit of the first frame of the 24 frames of a DS1 multi-frame. As is known, each of 24 frames of a DS1 multi-frame has a duration of 125 μsecs. Furthermore, the VCAT overhead is a subset of LCAS overhead.

Figure 3B:
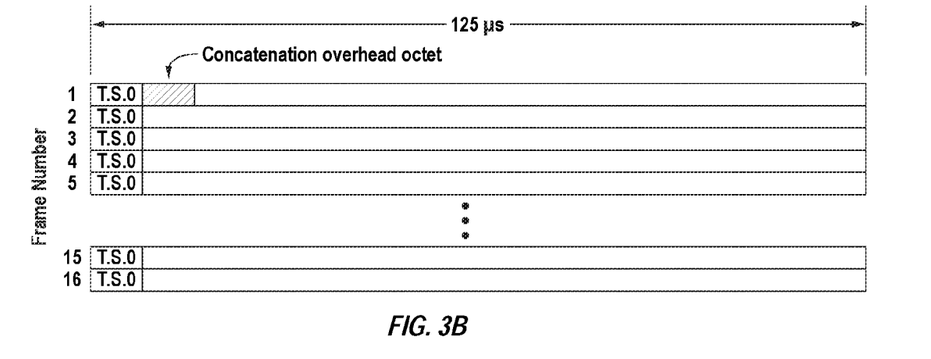
FIG. 3B shows an E1 frame adapted to carry an overhead byte, in accordance with one embodiment of the present invention.

Referring to FIG. 3B, the VCAT and LCAS overhead octet is disposed after the timeslot 0 (T.S.0) byte of the first frame of the 16 frames of an E1 multi-frame. As is known, each of the 16 frames of an E1 multi-frame has a duration of 125 μsecs.

Figure 3C:
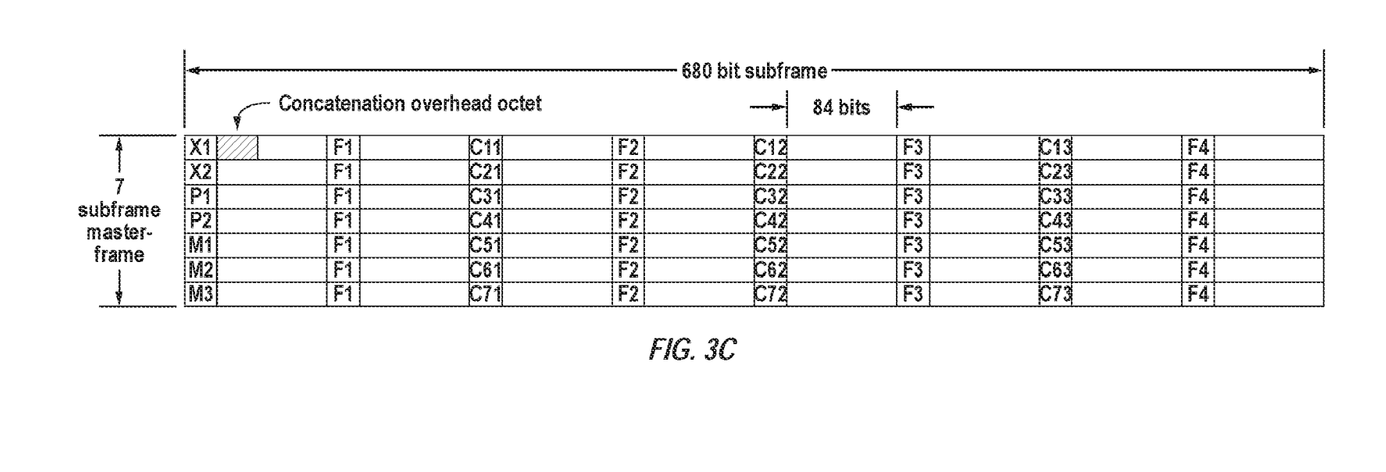
FIG. 3C shows a DS3 frame adapted to carry an overhead byte, in accordance with one embodiment of the present invention.
Figure 3D:
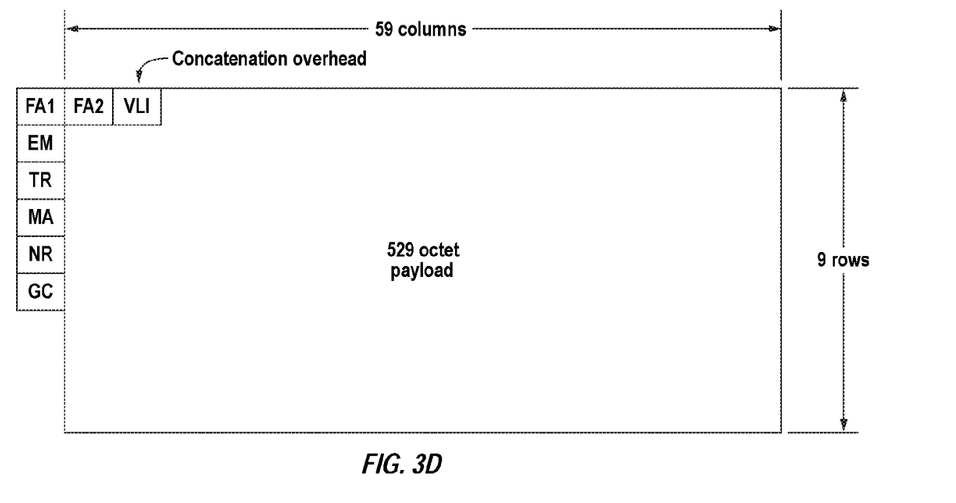
FIG. 3D shows an E3 frame adapted to carry an overhead byte, in accordance with one embodiment of the present invention.

Referring to FIG. 3C, the VCAT and LCAS overhead octet is disposed after the X1 bit of the first subframe of the DS3 multi-frame. As is known, there are 7 subframes in each DS3 multiframe, with each subframe containing 680 bits. Referring to FIG. 3D, the VCAT and LCAS overhead octet is disposed after the second frame alignment FA2 of the E3 multiframe. As is known, each of the frame alignments FA1 and FA2 include one byte.

Figure 4A:
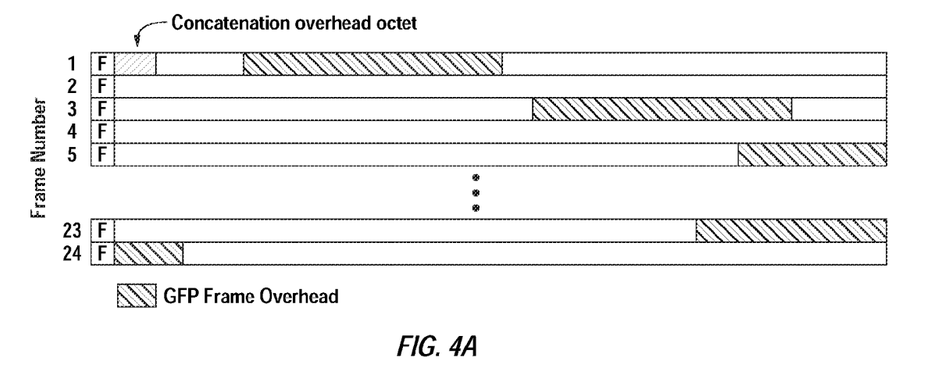
FIG. 4A shows the framing overhead as well overhead bits of a DS1 signal, in accordance with one embodiment of the present invention.
Figure 4B:
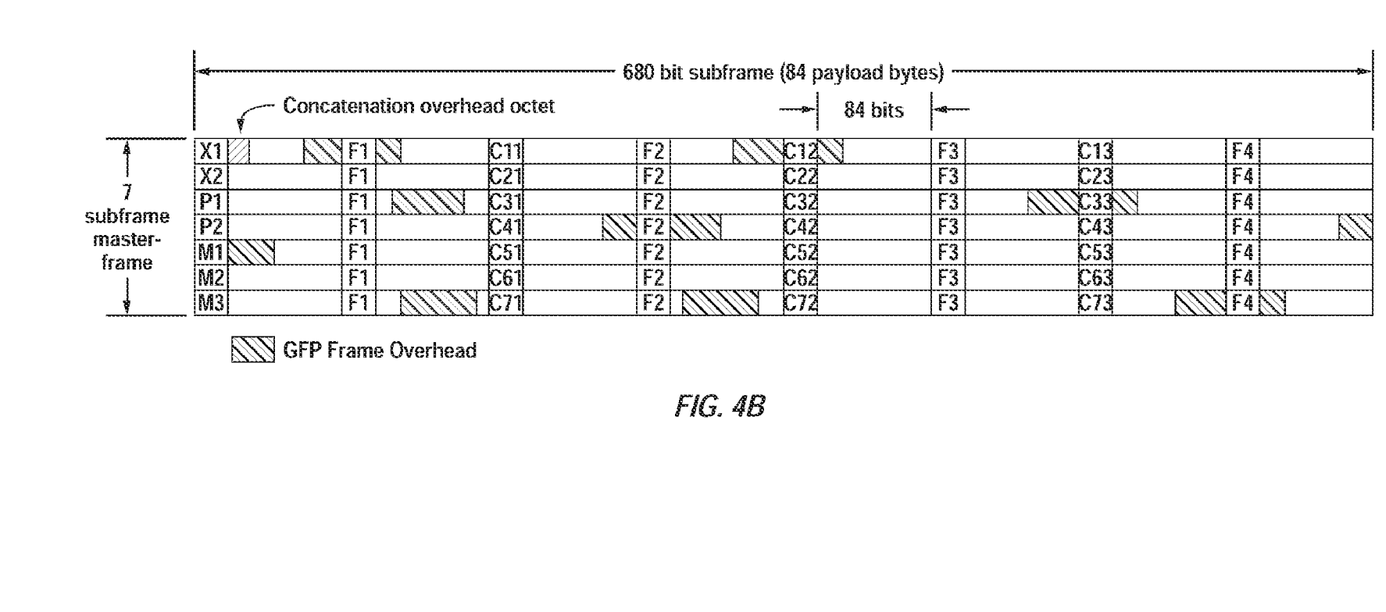
FIG. 4B shows the framing overhead as well overhead bits of a DS3 signal, in accordance with one embodiment of the present invention.

FIGS. 4A and 4B respectively show mapping of GFP frames into PDH channels. In FIG. 4A the octet-aligned GFP frame is shown as being mapped into a DS1 signal. In FIG. 4B the octet-aligned GFP frame is shown as being mapped into a DS3 signal.

Figure 5:
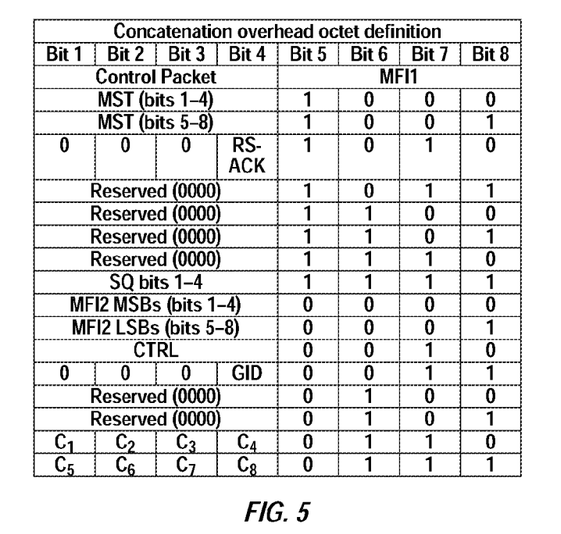
FIG. 5 shows the LCAS and VCAT overhead bits carried by a PDH signal, in accordance with one embodiment of the present invention.

FIG. 5 shows the combined LCAS and VCAT control packet carrying the overhead bits, in accordance with one embodiment of the present invention. The overhead bits shown in FIG. 5 are adapted to carry the same type of LCAS control packet as is used in the SONET/SDH H4 byte; see PMC white paper PMC-2030895, the content of which is incorporated herein by reference in its entirety. The PDH and SONET/SDH control packet format and bit definitions are identical except for the number of bits used in the sequence number (SQ) and the specific multiplexing of the member status information into the MST bits of each control packet. As seen from FIG. 5, the control packet has 16 rows. the transmission order of the control packet in FIG. 5 is left to right for the bits, and top to bottom for the octets. In other words, each row of the control packet is inserted as an overhead octet in a different one of the multi-frames of, for example, the DS1 or E1 signals.

In all of the fields, the MSB is the first bit to be transmitted. In the case of the SQ, SONET/SDH allows a maximum of 256 members and hence uses a two-nibble (8-bit) SQ field. The maximum number of members is 16 for DS1/E1, and is eight for DS3/E3. Hence, they require a SQ field of 4-bits and 3-bits, respectively. Since the SQ values are justified to the LSBs with the upper, unused SQ field bits set to 0, the SQ field use is consistent for SONET/SDH (H4), DS1/E1, and DS3/E3 member types.

For DS1/E1, DS3/E3, and SONET/SDH member types, the member status is multiplexed into the MST field based on the multiframe count in the MFI1 and MFI2 fields. In the case of the DS3/E3 signals, a maximum of eight signals can be virtually concatenated into a single group. The member status of all eight signals is carried in each LCAS control packet, with MST bits 1-8 containing the status for the members with SQ 0-7, respectively. Since a maximum of 16 DS1/E1 signals is allowed in VCAT group, the member status must be multiplexed into the eight MST bits. Whenever the current MFI2 LSB (i.e., the MFI2 bit 8 value from the previous control packet) is 0, MST bits 1-8 will contain the status of members with SQ 0-7, respectively. Whenever the current MFI2 LSB is 1, MST bits 1-8 will contain the status of members with SQ 8-15, respectively.

In order to achieve adequate differential delay compensation, a sufficiently long multiframe count is required so that the receiver can compare the relative multiframe phases of each member signal. A multiframe of 512 ms is a typical objective for worst-case networks. In the case of DS1 and E1 signals, the signal has an inherent multiframe with duration of 3 ms and 2 ms, respectively. Since the VCAT overhead byte only appears once per multiframe, the multiframe duration can be used to shorten the multiframe counter portion of the VCAT overhead. Specifically, if the counter were limited to an 8-bit counter within the control packet itself, the VCAT multiframe would be 28×3=768 ms (±384 ms) for DS1 and 28×2=512 ms (+256 ms) for E1, which meet the desired worst-case criterion.

Figure 6:
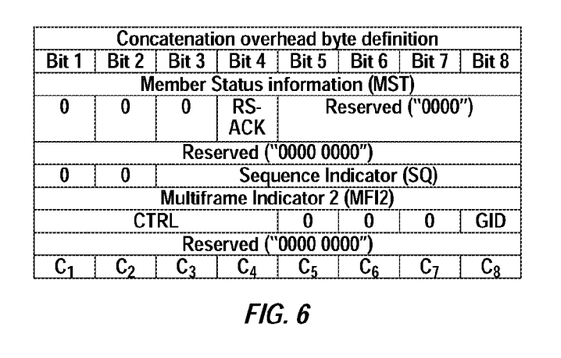
FIG. 6 shows the LCAS and VCAT overhead bits carried by a PDH signal, in accordance with another embodiment of the present invention.

FIG. 6 shows a virtual concatenation control packet format, in accordance with another embodiment of the present invention. In accordance with this embodiment, the entire 8-bits of the overhead byte are used for control packet instead just four bits, which decreases the time required to transmit a control packet. Cutting the control packet transmission time in half means that the member status information can be refreshed twice as fast. The virtual concatenation control packet shown in FIG. 6 includes 8 rows. Each row is inserted as an overhead octet in a different one of the multi-frames of the DS1, E1, DS3 or E3 signals.

Due to their continuing nearly universal availability, PDH networks will continue to play an important role as carriers roll out new data services. This will be especially true in North America as long as DS1s and DS3s have a cost advantage due to unbundling tariffs in the access networks. The new ITU-T Rec. G.8040 provides an efficient, robust GFP-based mapping into PDH signals and the new ITU-T Rec. G.7043 provides the virtual concatenation capability with LCAS to flexibly choose and adjust the channel size in a PDH network. The combination of these two technology enhancements to PDH networks provides carriers with powerful tools to offer new, higher-rate Ethernet connectivity services while continuing to derive benefit from their existing PDH infrastructures. Providing new services and maximizing the return on existing capital investment are always highly desirable for carriers. Accordingly, the present invention provides a highly flexible technique to allow the use of DS1/DS3/E1/E3 infrastructure to provide these new services, and do so in a manner that is operationally consistent with their deployment of virtual concatenation and LCAS technology in SONET/SDH networks.

Asynchronous hierarchy/PDH networks based on DS1, E1, DS3, and E3 networks are still more ubiquitous than SONET/SDH networks, and are the most common client payload signal carried within SONET/SDH networks. In areas such as North America, they currently also have cost advantages over SONET/SDH channels for leased connectivity through ILECs by other carriers. With the growth of interest in higher bandwidth Ethernet WAN service, in accordance with the present invention, the DS1, E1, DS3, and E3 signals are used to provide WAN access over the existing carrier infrastructure. As such, the present invention may be used to significantly increase the number of data access interfaces, especially those leased by service providers and interexchange carriers through ILEC networks, and multiple equipment vendors.

The above embodiments of the present invention are illustrative and not limiting. Various alternatives and equivalents are possible. The invention is not limited by the type of encapsulation or inverse multiplexing performed. The invention is not limited by the type of PDH, e.g., DS1, E1, signal that is transmitted using virtual concatenation. The invention is not limited to any particular arrangement of overhead bits inserted in the frames. The invention is not limited by the rate used to transfer the data. The invention is not limited by the type of integrated circuit in which the present disclosure may be disposed. Nor is the disclosure limited to any specific type of process technology, e.g., CMOS, Bipolar, or BICMOS that may be used to manufacture the present disclosure. Other additions, subtractions or modifications are obvious in view of the present disclosure and are intended to fall within the scope of the appended claims.

What is claimed is:

1. A method for transmitting data over a plurality of channels each associated with a PDH signal said plurality of channels to be virtually concatenated to form a single second channel larger than each of the plurality of channels, the method comprising:
    encapsulating the data packets;
    inverse multiplexing said encapsulated data packets into N PDH signals, each PDH signal comprising P frames; wherein N and P are non-zero integers;
    forming M groups of overhead bits for each of the N PDH signals, each of the M groups of overhead bits comprising a sequence number indicator and a multi-frame indicator;
    substituting a different one of the M groups of overhead bits for a corresponding number of payload bits in one frame or a subframe out of every P frames of an associated PDH signal thereby to form M×P frames wherein M is a non-zero integer; and
    transmitting each of the M×P frames, wherein × represents a multiplication operation, wherein each of the transmitted M groups of overhead bits forms an overhead packet that enables a receiver to determine the status of the M×P frames and extract the differential delay experienced by the N PDH signals as they are routed through the virtually concatenated channels.

2. The method of claim 1 wherein said PDH signal is selected from a group consisting of DS1, DS3, E1 and E3 signals.

3. The method of claim 1 wherein said encapsulation further comprises Generic Framing Procedure encapsulation.

4. The method of claim 1 wherein said PDH signal is a DS1 signal and said M is 16, wherein each of the 16 groups of overhead bits comprises an octet disposed adjacent the framing bit of a first frame of the 24 multi-frames of the DS1 signal.

5. The method of claim 1 wherein said PDH signal is an E1 signal and said M is 16, wherein each of the 16 groups of the overhead bits comprises an octet disposed adjacent the time slot zero of a first frame of the 16 multi-frames of the E1 signal.

6. The method of claim 1 wherein said PDH signal is a DS3 signal and said M is 16, wherein each of the 16 groups of the overhead bits comprises an octet disposed adjacent the X1 bit of a first frame of the 7 multi-frames of the DS3 signal.

7. The method of claim 1 wherein said PDH signal is an E3 signal and said M is 16, wherein each of the 16 groups of the overhead bits comprises an octet disposed adjacent the second frame alignment byte of the E3 multi-frame.

8. The method of claim 1 wherein said M is 16 and wherein said 16 groups of overhead bits comprise Link Capacity Adjustment Scheme (LCAS) bits and virtual concatenation (VCAT) bits.

9. The method of claim 1 wherein said PDH signal is a DS1 signal and said M is 8, wherein each of the 8 groups of overhead bits comprises an octet disposed adjacent the framing bit of a first frame of the 24 multi-frames of the DS1 signal.

10. The method of claim 1 wherein said PDH signal is an E1 signal and said M is 8, wherein each of the 8 groups of the overhead bits comprises an octet disposed adjacent the time slot zero of a first frame of the 16 multi-frames of the E1 signal.

11. The method of claim 1 wherein said PDH signal is a DS3 signal and said M is 8, wherein each of the 8 groups of the overhead bits comprises an octet disposed adjacent the X1 bit of a first frame of the 7 multi-frames of the DS3 signal.

12. The method of claim 1 wherein said PDH signal is an E3 signal and said M is 8, wherein each of the 8 groups of the overhead bits comprises an octet disposed adjacent the second frame alignment byte of the E3 multi-frame.

13. The method of claim 1 further comprising:
receiving the P×M frames;
extracting differential delay information from the received overhead bits of the P×M frames; and
extracting status information from the received overhead bits of the P×M frames.

14. An apparatus configured to transmit data over a plurality of channels each associated with a plesiochronous digital hierarchy (PDH) signal, said plurality of channels to be virtually concatenated to form a single second channel larger than each of the plurality of channels the apparatus comprising:
an encapsulation module configured to encapsulate the data packets;
an inverse multiplexer configured to inverse multiplex said encapsulated data packets into N PDH signals, each PDH signal comprising P frames; wherein N and P are non-zero integers;
an overhead processor configured to:
form M groups of overhead bits for each of the N PDH signals, each of the M groups of overhead bits comprising a sequence number indicator and a multi-frame indicator; and
substitute a different one of the M groups of overhead bits for a corresponding number of payload bits in one frame or a subframe out of every P frames of an associated PDH signal thereby to form M×P frames; wherein M is a non-zero integer; and
a transmitter configured to transmit each of the M×P frames, wherein × represents a multiplication operation, wherein each of the transmitted M groups of overhead bits forms an overhead packet that enables a receiver to determine the status of the M×P frames and extract the differential delay experienced by the N PDH signals as they are routed through the virtually concatenated channels.

15. The apparatus of claim 14 wherein said PDH signal is selected from a group consisting of DS1, DS3, E1 and E3 signals.

16. The apparatus of claim 14 wherein said encapsulation module is further configured to encapsulated in accordance with Generic Framing Procedure encapsulation.

17. The apparatus of claim 14 wherein PDH signal is a DS1 signal and said M is 16, wherein each of the 16 groups of overhead bits comprises an octet disposed adjacent the framing bit of a first frame of the 24 multi-frames of the DS1 signal.

18. The apparatus of claim 14 wherein said PDH signal is an E1 signal and said M is 16, wherein each of the 16 groups of the overhead bits comprises an octet disposed adjacent the time slot zero of a first frame of the 16 multi-frames of the E1 signal.

19. The apparatus of claim 14 wherein said PDH signal is a DS3 signal and said M is 16, wherein each of the 16 groups of the overhead bits comprises an octet disposed adjacent the X1 bit of a first frame of the 7 multi-frames of the DS3 signal.

20. The apparatus of claim 14 wherein said PDH signal is an E3 signal and said M is 16, wherein each of the 16 groups of the overhead bits comprises an octet disposed adjacent the second frame alignment byte of the E3 multi-frame.

21. The apparatus of claim 14 wherein said M is 16 and wherein said 16 groups of overhead bits comprise Link Capacity Adjustment Scheme (LCAS) bits and virtual concatenation (VCAT) bits.

22. The apparatus of claim 14 wherein said PDH signal is a DS1 signal and said M is 8, wherein each of the 8 groups of overhead bits comprises an octet disposed adjacent the framing bit of a first frame of the 24 multi-frames of the DS1 signal.

23. The apparatus of claim 14 wherein said PDH signal is an E1 signal and said M is 8, wherein each of the 8 groups of the overhead bits comprises an octet disposed adjacent the time slot zero of a first frame of the 16 multi-frames of the DS3 signal.

24. The apparatus of claim 14 wherein said PDH signal is a DS3 signal and said M is 8, wherein each of the 8 groups of the overhead bits comprises an octet disposed adjacent the X1 bit of a first frame of the 7 multi-frames of the DS3 signal.

25. The apparatus of claim 14 wherein said PDH signal is an E3 signal and said M is 8, wherein each of the 8 groups of the overhead bits comprises an octet disposed adjacent the second frame alignment byte of the E3 multi-frame.

26. The apparatus of claim 14 further comprising:
a receiver configured to receive the transmitted P×M frames;
a second overhead processor configured to extract differential delay information from the received overhead bits of the P×M frames, and further to extract status information from the received overhead bits of the P×M frames.

* * * * *